United States Patent
Audenaert

(10) Patent No.: US 9,062,150 B2
(45) Date of Patent: Jun. 23, 2015

(54) SOIL AND STAIN RESISTANT COATING COMPOSITION FOR FINISHED LEATHER SUBSTRATES

(75) Inventor: Frans A. Audenaert, Kaprijke (BE)

(73) Assignee: 3M Innovative Properties Company, St. Paul, MN (US)

( * ) Notice: Subject to any disclaimer, the term of this patent is extended or adjusted under 35 U.S.C. 154(b) by 398 days.

(21) Appl. No.: 13/503,822

(22) PCT Filed: Oct. 27, 2010

(86) PCT No.: PCT/US2010/054213
§ 371 (c)(1),
(2), (4) Date: Apr. 24, 2012

(87) PCT Pub. No.: WO2011/053622
PCT Pub. Date: May 5, 2011

(65) Prior Publication Data
US 2012/0208030 A1   Aug. 16, 2012

(30) Foreign Application Priority Data
Oct. 30, 2009 (GB) .................................. 0919014.1

(51) Int. Cl.
| | | |
|---|---|---|
| B32B 9/02 | (2006.01) | |
| B32B 27/06 | (2006.01) | |
| C14C 11/00 | (2006.01) | |
| C08G 18/78 | (2006.01) | |
| B32B 9/04 | (2006.01) | |
| C08G 18/28 | (2006.01) | |
| C08G 18/67 | (2006.01) | |
| C09D 175/16 | (2006.01) | |
| C14C 9/00 | (2006.01) | |
| D06M 15/256 | (2006.01) | |
| D06M 15/263 | (2006.01) | |
| D06M 15/33 | (2006.01) | |
| D06M 15/564 | (2006.01) | |
| D06M 15/568 | (2006.01) | |
| D06M 15/576 | (2006.01) | |

(52) U.S. Cl.
CPC ............ *C08G 18/7831* (2013.01); *B32B 9/025* (2013.01); *B32B 9/045* (2013.01); *C08G 18/2885* (2013.01); *C08G 18/673* (2013.01); *C09D 175/16* (2013.01); *C14C 9/00* (2013.01); *C14C 11/006* (2013.01); *D06M 15/256* (2013.01); *D06M 15/263* (2013.01); *D06M 15/33* (2013.01); *D06M 15/564* (2013.01); *D06M 15/568* (2013.01); *D06M 15/576* (2013.01)

(58) Field of Classification Search
None
See application file for complete search history.

(56) References Cited

U.S. PATENT DOCUMENTS

| | | |
|---|---|---|
| 3,493,424 A | 2/1970 | Mohrlok |
| 3,661,631 A | 5/1972 | Plapper et al. |
| 3,706,594 A | 12/1972 | Wasley et al. |
| 4,076,631 A | 2/1978 | Caruso |
| 4,262,072 A | 4/1981 | Wendling |
| 4,321,404 A | 3/1982 | Williams |
| 4,351,736 A | 9/1982 | Steinberger |
| 4,501,591 A | 2/1985 | Ucci |
| 4,612,356 A | 9/1986 | Falk |
| 4,614,667 A | 9/1986 | Larson |
| 4,709,074 A | 11/1987 | Bathelt |
| 4,778,915 A | 10/1988 | Lina |
| 4,781,844 A | 11/1988 | Kortmann |
| 4,822,373 A | 4/1989 | Olson |
| 4,875,901 A | 10/1989 | Payet |
| 4,885,332 A | 12/1989 | Bilkadi |
| 4,920,190 A | 4/1990 | Lina |
| 4,960,543 A | 10/1990 | Wehowsky |
| 4,963,409 A | 10/1990 | Liss |
| 4,985,473 A | 1/1991 | Williams |
| 5,073,442 A | 12/1991 | Knowlton |
| 5,100,954 A | 3/1992 | Itoh |
| 5,216,097 A | 6/1993 | Allewaert |
| 5,623,037 A | 4/1997 | Simeone |
| 5,677,050 A | 10/1997 | Bilkadi |
| 5,962,611 A | 10/1999 | Meijs |
| 6,132,861 A | 10/2000 | Kang |
| 6,238,798 B1 | 5/2001 | Kang |
| 6,239,247 B1 | 5/2001 | Allewaert |

(Continued)

FOREIGN PATENT DOCUMENTS

| | | |
|---|---|---|
| CN | 1590411 | 3/2005 |
| CN | 101341173 | 1/2009 |

(Continued)

OTHER PUBLICATIONS

Extended European Search Report, PCT/US2010054213, mailed Apr. 13, 2013, 10 pages.

(Continued)

*Primary Examiner* — Ramsey Zacharia

(57) ABSTRACT

A coated leather substrate having at least one surface that comprises at least one first layer above that surface and at least one second layer above that first layer and, the first layer comprises at least one polymer and wherein the second layer being different in its chemical composition from the first layer comprises the reaction product of a cross-linking reaction of at least one first composition said first composition comprising one or more compounds having at least one fluoropolyether segment and at least two cross-linkable groups and said second composition comprising at least one fluorinated polyolefin. Furthermore are provided a coating composition, methods of coating leather substrates and use of the coating compositions.

8 Claims, No Drawings

(56) References Cited

U.S. PATENT DOCUMENTS

| | | | |
|---|---|---|---|
| 6,245,833 B1 | 6/2001 | Kang | |
| 6,376,572 B1 | 4/2002 | Turri | |
| 6,376,576 B2 | 4/2002 | Kang | |
| 6,391,459 B1 | 5/2002 | Szum | |
| 6,468,587 B2 | 10/2002 | Chang | |
| 6,479,612 B1 | 11/2002 | Del Pesco | |
| 6,497,961 B2 | 12/2002 | Kang | |
| 6,646,088 B2 | 11/2003 | Fan | |
| 6,660,338 B1 | 12/2003 | Hargreaves | |
| 6,660,389 B2 | 12/2003 | Liu | |
| 6,673,889 B1 | 1/2004 | Weinert | |
| 6,680,118 B2 | 1/2004 | Szum | |
| 6,790,924 B2 | 9/2004 | Anton | |
| 6,803,109 B2 | 10/2004 | Qiu | |
| 6,906,115 B2 | 6/2005 | Hanazawa | |
| 6,923,921 B2 | 8/2005 | Flynn | |
| 6,995,222 B2 | 2/2006 | Buckanin | |
| 7,026,030 B2 | 4/2006 | Itoh | |
| 7,074,472 B2 | 7/2006 | Itoh | |
| 7,090,909 B2 | 8/2006 | Itoh | |
| 7,094,829 B2 | 8/2006 | Audenaert | |
| 7,101,618 B2 | 9/2006 | Coggio | |
| 7,173,778 B2 | 2/2007 | Jing | |
| 7,267,850 B2 | 9/2007 | Coggio | |
| 7,332,217 B2 | 2/2008 | Coggio | |
| 7,342,080 B2 | 3/2008 | Qiu | |
| 7,399,530 B2 | 7/2008 | Hayashida | |
| 7,575,847 B2 | 8/2009 | Jing | |
| 7,803,894 B2 | 9/2010 | Dams | |
| 2001/0005530 A1 | 6/2001 | Clark | |
| 2002/0182410 A1 | 12/2002 | Szum | |
| 2003/0105263 A1 | 6/2003 | Fan | |
| 2004/0077238 A1 | 4/2004 | Audenaert | |
| 2004/0109947 A1 | 6/2004 | Weinert | |
| 2005/0043478 A1 | 2/2005 | Huang et al. | |
| 2005/0072336 A1 | 4/2005 | Itoh | |
| 2005/0096244 A1 | 5/2005 | Audenaert | |
| 2005/0106404 A1 | 5/2005 | Hayashida | |
| 2005/0137355 A1 | 6/2005 | Buckanin | |
| 2005/0158558 A1 | 7/2005 | Hayashida | |
| 2005/0182199 A1 | 8/2005 | Jing | |
| 2005/0249942 A1 | 11/2005 | Coggio | |
| 2005/0260414 A1 | 11/2005 | MacQueen | |
| 2006/0054053 A1* | 3/2006 | Masutani et al. | 106/2 |
| 2006/0084756 A1 | 4/2006 | Southwell | |
| 2006/0147722 A1 | 7/2006 | Ohashi | |
| 2006/0148350 A1 | 7/2006 | Chang | |
| 2006/0150863 A1 | 7/2006 | Ueda | |
| 2006/0216524 A1 | 9/2006 | Klun | |
| 2007/0082192 A1 | 4/2007 | Kondo | |
| 2007/0148596 A1 | 6/2007 | Hayashida | |
| 2007/0243389 A1 | 10/2007 | Audenaert | |
| 2009/0149616 A1 | 6/2009 | Audenaert | |
| 2009/0306284 A1 | 12/2009 | Reiners | |

FOREIGN PATENT DOCUMENTS

| | | |
|---|---|---|
| DE | 2052579 A1 | 5/1972 |
| EP | 0098698 | 1/1984 |
| EP | 0379462 | 7/1990 |
| EP | 0525795 | 2/1993 |
| EP | 0819143 | 1/1998 |
| EP | 1123981 | 8/2001 |
| EP | 1298180 | 4/2003 |
| EP | 1577400 | 9/2005 |
| EP | 1820809 | 8/2007 |
| GB | 932430 | 7/1963 |
| JP | 02194031 | 7/1990 |
| JP | 1993-209030 | 8/1993 |
| JP | 01072568 | 3/1998 |
| JP | 1999-080312 | 3/1999 |
| JP | 11080312 | 3/1999 |
| JP | 11-510209 | 9/1999 |
| JP | 2004-043619 | 2/2004 |
| JP | 2004-043671 | 2/2004 |
| JP | 2004-204096 | 7/2004 |
| WO | WO 00-50517 | 8/2000 |
| WO | WO 03-072625 | 9/2003 |
| WO | WO 03-100158 | 12/2003 |
| WO | WO 03-100159 | 12/2003 |
| WO | WO 2004-067499 | 8/2004 |
| WO | WO 2005-049687 | 6/2005 |
| WO | WO 2006-007507 | 1/2006 |
| WO | WO 2006-074085 | 7/2006 |
| WO | WO 2007-071323 | 6/2007 |
| WO | WO 2007-121110 | 10/2007 |

OTHER PUBLICATIONS

Bongiovanni, "Properties of UV-curable coatings containing fluorinated acrylic structures," Progress in Organic Coatings, Jun. 1999, vol. 36, No. 1-2, pp. 70-78.

Cohen, "Modern Coating and Drying Technology," VCH Publishers, 1992, ISBN 3-527-28246-7, 9 pages.

Gutoff, "Coating and Drying Defects: Troubleshooting Operating Problems," Wiley-Interscience, 1995, ISBN 0-471-59810-0, 7 pages.

Priola, "UV-curable systems containing perfluoropolyether structures: synthesis and characterisation," Macromol. Chem. Phys., Jun. 1997, vol. 198, No. 6, pp. 1893-1907.

Solvay Solexis Product Data Sheet, Fomblin Z Derivatives, modified Dec. 13, 2002, URL <http://www.solvaysolexis.com/static//wma/pdf/5/4/3/4/fom_thin.pdf>, 3 pages.

Extended European Search Report for EP/07797200.8, searched Apr. 16, 2009, 2 pages.

GB Search Report for GB/0919014.1, searched Feb. 23, 2010, 2 pages.

International Search Report for PCT/US2010/054213, mailed Jul. 29, 2011, 4 pages.

International Preliminary Report on Patentability issued by the International Bureau of WIPO, for International Application No. PCT/US2010/054213, on May 10, 2012; 7 pgs.

Chinese Office Action issued by the Patent office of the Chinese State Intellectual Property Office, dated Jul. 12, 2013 for CN Application No. 201080049605.X; 15 pgs.

Taiwan Office Action issued by the Taiwan Office Action, dated Nov. 18, 2014, for TW Application No. 099137368; 6 pgs.

* cited by examiner

SOIL AND STAIN RESISTANT COATING COMPOSITION FOR FINISHED LEATHER SUBSTRATES

CROSS REFERENCE TO RELATED APPLICATIONS

This application is a national stage filing under 35 U.S.C. 371 of PCT/US2010/054213, filed Oct. 27, 2010, which claims priority to GB Application No. 0919014.1, filed Oct. 30, 2009, the disclosure of which is incorporated by reference in its/their entirety herein.

FIELD

The present invention relates to compositions for coating leather substrates having at least one primer layer. In particular the coating compositions provide coated leather substrates with improved soil and stain resistance. The invention further relates to a method of making a coated leather substrate.

BACKGROUND ART

The use of leather substrates in car interiors and in furniture has increased significantly in recent years. Especially light coloured, beige or white leather car interior or furniture has found increased importance for its attractive appearance. A coating is typically applied to the surface of the leather to provide increased protection. Such leather substrates are commonly known as coated or finished leather to distinguish them from leather substrates that do not contain such protective coatings and which are commonly referred to as unfinished leather, suede or nubuck leather. Protective coatings may comprise several layers, including at least one first layer, also referred to as base coat or primer layer. The coatings may further comprise middle coats and topcoats. To make leather substrates stain and dirt repellent topcoats comprising fluorine-containing resins have been used, as is described, for example, in European patent applications No. EP 1 123 981 and EP 1 577 400. EP 1123981 discloses leather coated with a cured fluorine-containing resin coating. The coating is obtained by curing a curable fluorine-containing resin composition comprising a fluorine-containing resin having a reactive curable group and a curing agent. EP 1 577 400 describes a paint composition for leather comprising a fluorine-containing resin and a silicone oil, and a paint composition for leather comprising a curable fluorine-containing resin, a curing agent and a silicone oil.

Despite developments made in protective top coats for finished leathers, these leathers may still suffer from dry soils and aqueous or oily soils that attach to the coating and soil removal may still be difficult. A further disadvantage is that in order to be effective in repellency, in particular for stain repellency and stain release, fluorine-containing top layers have to be highly cross-linked and of considerable thickness. This, however, may lead to give the leather an unnatural glossy appearance, which may be undesired.

A further disadvantage of thick coatings lies in potential crack formation when bending the leather substrate. This is of particular importance for leather substrates, used in articles having an outer surface that needs to be flexible in its use, such as for example seats, garments, shoes, handbags, gloves and belts.

Therefore, there has been a continuous need for coating compositions that may provide good or improved stain and/or soil resistance to leather substrates. Desirably, such coatings obtained from such compositions maintain the natural look or mat appearance of the leather. Favourably, the compositions provide a flexible coating that has no or only reduced crack formation upon bending.

SUMMARY

It has now been found that leather substrates coated with a fluorinated layer can be obtained that have good dirt and soil repellent properties. Such coatings may be prepared while maintaining a mat appearance of the leather. The coatings may also have good flexibility without crack formation.

Therefore, in one aspect there is provided a coated leather substrate having at least one surface that comprises at least one first layer above that surface and at least one second layer above that first layer and, the first layer comprises at least one polymer and wherein the second layer being different in its chemical composition from the first layer comprises the reaction product of a cross-linking reaction of at least one first composition said first composition comprising one or more compounds having at least one fluoropolyether segment and at least two cross-linkable groups and said second composition comprises at least one fluorinated polyolefin.

In another aspect there is provided a cross-linkable coating composition comprising:
a. at least one compound having two or more cross-linkable groups and at least one fluoropolyether segment and
b. at least one fluorinated polyolefin.

In a further aspect there is provided a method of making a leather substrate comprising applying a coating composition as described above to a leather.

In yet another aspect there is provided the use of a coating composition for coating a leather substrate.

DETAILED DESCRIPTION

Before any embodiments of this disclosure are explained in detail, it is to be understood that the disclosure is not limited in its application to the details of compositions and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including", "containing", "comprising", or "having" and variations thereof is meant to be of broad scope and is meant to encompass the items listed thereafter, equivalents thereof and further items. The word "consisting of" is meant to be of limiting scope and is meant to encompass only the items listed thereafter and equivalents thereof but not any additional items. The term "consisting essentially of" has a meaning as defined in the description below.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

In one embodiment the present invention relates to coating compositions useful for coating leather substrates. The leather substrates are typically finished or coated leather substrates, i.e. leather substrates having at least one surface that has been coated. Therefore, the leather substrates have at least one surface having thereon at least one first layer, for example a primer layer. This first layer or primer layer typically forms a barrier layer, preventing further applied layers penetrating into the leather substrate. As a consequence, subsequently applied layers may be formed on top of the primer layer or on top of further layers that had already been applied to the first layer. The coating composition may be used to form a second layer of the leather substrate. The wording "second layer" does not mean that there are only two layers. It is meant to distinguish the coating obtained from the coating composition as being a chemically different composition than the first layer. The second layer is obtained by curing a coating composition. The coating composition may be applied directly to the first layer or it may be applied to further layers that have been applied to the first layer. Preferably, the coating compositions provided herewith are used to form a top coat, i.e. an outer layer or even the surface layer of the leather substrate.

The material used for the first layers or primer layers of finished leather are typically non-fluorine containing compositions. Typically the compositions comprise at least one non-fluorinated polymer. For example, the first layers can be formed by applying a coating composition comprising a poly(meth)acrylate, nitrocellulose, polyurethane, acrylonitrile containing polymers, butadiene or styrene containing polymers, vinyl chloride, vinylidene chloride and/or vinyl acetate containing polymers or a mixture of two or more thereof to a leather. By forming a primer layer, smoothness and uniformity of appearance of the leather substrate can be enhanced. Typical first layers comprise poly(meth)acrylates, nitrocelluloses, polybutadienes, polystyrenes, polyurethanes copolymers, blends and combinations thereof.

The first layers may be continuous are discontinuous. Typically, the first layers are continuous.

The second layer comprises the reaction product of a cross-linking reaction of at least one first composition comprising at least one compound having two or more cross-linkable groups and at least one fluoropolyether segment.

The cross-linkable groups are capable of undergoing a cross-linking reaction by a free radical reaction when exposed to radicals generated by decomposition of a suitable initiator (i.e. a radical generating compound), by application of heat and/or radiation, such as actinic irradiation, e-beam irradiation, laser irradiation or UV-irradiation.

In a typical embodiment the cross-linkable groups are ethylenically unsaturated groups. The cross-linkable groups are preferably at a terminal position of the molecule containing them.

Suitable ethlyenically unsaturated groups include, for example but are not limited thereto, vinyl ethers, vinyl esters, allyl esters, vinyl ketones, styrene, vinyl amide, acrylamides, maleates, fumarates, acrylates and methacrylates. Of these, acrylates and methacrylates are preferred.

The fluoropolyether segment typically comprises one or more partially fluorinated polyether units, one or more perfluorinated polyether units or a combination thereof. Preferably, the fluoropolyether segment comprises one or more perfluorinated polyether units or consists of a perfluorinated polyether. The term 'perfluorinated polyether' as used herein means a unit that only consists of carbon, fluorine and oxygen atoms and that contains at least two oxygen (ether; —O—) linkages.

The perfluorinated polyether segment typically comprises one or more repeating units selected from —$C_pF_{2p}$—, —$C_pF_{2p}O$—, —CFZ—, —CFZO—, —$CFZC_pF_{2p}O$—, —$C_pF_{2p}CFZO$—, —$CF_2CFZO$— and mixtures as well as random combinations thereof, wherein p is an integer of 1 to 4 and Z is F or a perfluoroalkyl group of 1 to 4 carbon atoms, wherein the alkyl chain may be interrupted once or multiple times by oxygen atoms. The term "perfluoroalkyl" as used herein means that all hydrogen atoms of the alkyl group have been replaced by fluorine atoms. The term "fluorinated" or "partially fluorinated" means that at least one but not all hydrogen atoms have been replaced by fluorine atoms. The perfluorinated polyether segment may comprise a repetition of the same unit or may contain a random combination of different units. For example, the segment may contain the same (per)fluorinated alkylene oxy units or a different (per)fluorinated alkylene oxy units. When the perfluorinated polyether segment comprises different (per)fluorinated alkylene oxy units, they can be present in a random configuration, alternating configuration or they can be present as blocks. Typical examples of perfluorinated polyether units include: —[$CF_2CF_2O$]$_r$—; —[$CF(CF_3)CF_2O$]$_s$—; —[$CF_2CF_2O$]$_i$[$CF_2O$]$_j$—; —[$CF_2CF_2O$]$_l$—[$CF(CF_3)$ $CF_2O$]$_k$—; —$CF_2O$ ($CF_2O$)$_q$($C_2F_4O$)$_n$$CF_2$—, —($CF_2$)$_3$O($C_4F_8O$)$_n$($CF_2$)$_3$—, —$CF_2O(C_2F_4O)_nCF_2$— and —$CF(CF_3)[OCF_2CF(CF_3)]_sOC_rF_{2t}O(CF(CF_3)CF_2O)_nCF(CF_3)$—, wherein each r, i, j, l and k are integers of 1 to 25 and wherein each q, n and s have an average value of 1 to 50; the sum (n+s) has an average value of 0 to 50 or 4 to 40; the sum (q+n) is greater than 0; and t is an integer of 2 to 6.

Particularly suitable terminal perfluorinated polyether segments correspond to the general formula: $C_3F_7O(CF(CF_3)CF_2O)_nCF(CF_3)$— wherein n has a value of 1 to 60.

In one embodiment, the at least one compound having two or more cross-linkable groups and at least one fluoropolyether segment of the first composition is the reaction product of a) a polyisocyanate, b) a fluorinated compound having at least one fluoropolyether segment and having at least one isocyanate-reactive group and c) a compound having one or more ethylenically unsaturated groups and having at least one isocyanate-reactive group.

The term 'isocyanate reactive group' as used herein means a functional group that will react with an isocyanate group as known in the art. Typical reaction conditions include reacting at a temperature of 20 to 150° C., for example 30 to 120° C. The reaction may involve the use of a catalyst as known in the art of isocyanate chemistry. Generally, an isocyanate reactive group includes at least one Zerewittenoff hydrogen. Though not intended to be limiting, examples of isocyanate reactive groups include: alcohols, amines, thiols and carboxylic acids and derivatives thereof. Useful isocyanate reactive groups include for example —OH, —NH— or —$NH_2$ and —SH, —$CO_2R^3$, where $R^3$ is hydrogen or hydroxyalkyl, —C(O)N($R^1$)($R^2$), where $R^1$ and $R^2$ are independently hydrogen, hydroxyalkyl or polyalkylenepolyamine. Particularly useful isocyanate reactive groups include —OH, —NH— and —$NH_2$ groups.

The fluorinated compound having at least one fluoropolyether segment and having at least one isocyanate-reactive group typically has one or more (per)fluoropolyether segments and one or more hydroxyl and/or amine groups. Mixtures of fluorinated compounds having one or more isocyanate-reactive groups are contemplated for use as well.

In one embodiment, the fluorinated compound having at least one fluoropolyether segment and having at least one isocyanate-reactive group can be represented by the general formula:

$$R_f\text{—}Q\text{—}(OH)_b \qquad (I)$$

wherein $R_f$ represents a fluoropolyether segment, preferably a perfluorinated polyether segment, Q represents a divalent or trivalent (preferably non-fluorinated) organic linking group, b is 1 or 2. Examples of linking groups Q include organic groups that comprise aromatic or aliphatic groups that may be interrupted by O, N or S and that may be substituted by alkylene groups, oxy groups, thio groups, urethane groups, carboxy groups, carbonyl groups, amido groups, oxyalkylene groups, thioalkylene groups, carboxyalkylene and/or amidoalkylene groups.

A particularly suitable perfluorinated polyether group $R_f$ corresponds to the formula $$C_3F_7O(CF(CF_3)CF_2O)_nCF(CF_3)— \quad (II)$$

wherein n is an integer of 1 to 60. Perfluorinated polyether groups of the above formula can conveniently be derived from the polymerization of hexafluoropropyleneoxide (HFPO). In one suitable embodiment, n is an integer of 3 to 50 and the corresponding perfluorinated polyether group has a molecular weight of at least 750 g/mol.

A further suitable perfluorinated polyether group $R_f$ corresponds to the formula:

$$CF_3O(CF_2O)_m(C_2F_4O)_oCF_2— \quad (III)$$

wherein m and o are integers from 1 to 60 and wherein the sum of m and o has a value 5 to 75. Perfluorinated polyether groups of the above formula can be derived from the photooxidation of TFE.

Suitable examples of fluorinated compounds include:

$C_3F_7O(CF(CF_3)CF_2O)_nCF(CF_3)$—$CONR^c$—$CH_2CHOHCH_2OH$ wherein $R^c$ is hydrogen or an alkyl group of for example 1 to 4 carbon atoms;

$C_3F_7O(CF(CF_3)CF_2O)_nCF(CF_3)$—CONH-1,4-dihydroxyphenyl;

$C_3F_7O(CF(CF_3)CF_2O)_nCF(CF_3)$—$CH_2OCH_2CHOHCH_2OH$;

$C_3F_7O(CF(CF_3)CF_2O)_nCF(CF_3)$—$COOCH_2CHOHCH_2OH$ $C_3F_7O(CF(CF_3)CF_2O)_nCF(CF_3)$—$CONR^d$—$(CH_2)_vOH$ $C_3F_7O(CF(CF_3)CF_2O)_nCF(CF_3)$—$CONR^d$—$((CH_2)_v$—$O)_w$—H $C_3F_7O(CF(CF_3)CF_2O)_nCF(CF_3)$—$CONHCH_2CH_2CH_2N(CH_2CH_2OH)_2$ where $R^d$ is hydrogen or an alkyl group such as methyl, ethyl, propyl, butyl, hexyl and v is 2, 3, 4, 6, 8, 10 or 11, w is 1-4; in all examples n is at least 1, preferably at least 3.

Particularly suitable example include compounds according to the general formula $C_3F_7O(CF(CF_3)CF_2O)_nCF(CF_3)$—CONH—$CH_2CH_2$—OH where n is at least 3.

Polyisocyanates that may be used to prepare the compound having two or more cross-linkable groups and at least one fluoropolyether segment include aliphatic isocyanates having 2, 3 or 4 isocyanate groups, aromatic isocyanates having 2, 3 or 4 isocyanate groups and combinations thereof. Examples of aliphatic diisocyanates include hexamethylenediisocyanate, 2,2,4-trimethyl-1,6-hexamethylenediisocyanate, and 1,2-ethylenediisocyanate, dicyclohexylmethane-4,4'-diisocyanate and 3-isocyanatomethyl-3,5,5-trimethylcyclohexylisocyanate (isophorone diisocyanate IPDI) and DDI 1410 (available from Cognis). Examples of aliphatic triisocyanates include 1,3,6-hexamethylenetriisocyanate. Examples of aromatic diisocyanates include 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate.

Examples of aromatic triisocyanates include polymethylene-polyphenylisocyanate (PAPI), DESMODUR™L, DESMODUR™W and tri-(4-isocyanatophenyl)-methane (DESMODUR™R) (all available from Bayer).

Further suitable examples include isocyanates containing internal isocyanate-derived moieties such as biuret-containing isocyanates having three or more isocyanate groups. One example includes the reaction product obtained from the trimerization of hexamethylene diisocyanate, in the presence of water. Biuret-containing isocyanates having three or more isocyanate groups are commercially available and include for example DESMODUR™N100 or TOLONATE™HDB, commercially available from Bayer or Rhodia respectively.

Further suitable examples include isocyanurate-containing tri-isocyanates, such as the cyclic trimer of hexamethylenediisocyanate and cyclic trimer of isophorone diisocyanate. Commercial examples include IPDI-1890, available from Huls AG. Further useful examples include azetidinedione-containing diisocyanates such as DESMODUR™TT, commercially available from Bayer AG, Leverkusen, Germany.

In a preferred embodiment, the polyisocyanates have at least 3 isocyanate groups. Particularly suitable are polyisocyanates containing internal isocyanate-derived moieties, such as the biuret-containing triisocyanates.

The compounds having one or more ethylenically unsaturated groups and having an isocyanate-reactive group are typically non-fluorinated compounds. They typically include isocyanate-reactive vinyl ethers, acrylamides, acrylates and methacrylates. Particular suitable compounds include isocyanate-reactive acrylates or methacrylates that can be represented by the formula:

$$T—Q^3—(OC(O)C(R_2)=CH_2)_t, \quad (IV)$$

wherein T represents an isocyanate reactive group, preferably OH or NR'H where R' is H or a lower alkyl group of 1 to 4 carbon atoms, $Q^3$ represents an organic linking group having a valence of t+1; $R_2$ is a lower alkyl with 1 to 4 C atoms or H and t is 1 to 6. Linking group $Q^3$ is independently selected from the group consisting of an alkylene, an arylene, an aralkylene, an alkarylene, a straight or branched chain or cyclic group containing connecting group optionally containing heteroatoms such as O, N, and S and optionally a heteroatom-containing functional group such as carbonyl or sulfonyl, and combinations thereof.

Suitable examples of non-fluorinated isocyanate-reactive acrylate or methacrylate compounds include hydroxyethyl (meth)acrylate, 1,3-glycerol dimethacrylate, hydroxypropyl (meth)acrylate, butanediol monoacrylate, pentaerythritol triacrylate, commercially available as SR444 from Sartomer and dipentaerythritol pentaacrylate, commercially available as SR399 from Sartomer. Further suitable compounds include compounds comprising (poly)oxyalkylene groups including (meth)acrylates of a polyethylene glycol, (meth)acrylates of a block copolymer of ethylene oxide and propylene oxide, and (meth)acrylates of aminoterminated polyethers.

Single non-fluorinated isocyanate-reactive acrylates or methacrylates may be used or combinations thereof.

The functionality of the isocyanate-reactive acrylates or methacrylates is typically chosen in function of the polyisocyanates used to obtain a compound having two or more ethylenically unsaturated groups. For example, when a diisocyanate is used a compound having at least two ethylenically unsaturated groups may be used. On the other hand, when an isocyanate having at least three isocyanate groups is used isocyanate-reactive monofunctional acrylates or methacrylates may be preferably employed.

In order to obtain a cross-linked composition having a higher crosslink density, the cross-linkable compound obtainable by the reaction of a) a polyisocyanate having at least 3 isocyanate groups, b) a fluorinated compound having a fluoropolyether segment and one isocyanate reactive group with c) a compound having an isocyanate-reactive group and two or more ethylenically unsaturated groups, in particular acrylate or methacrylate groups.

The compound having two or more cross-linkable groups and at least one fluoropolyether segment can be made in a one step or a two step reaction. For example, the compound can be made by first reacting the polyisocyanate with the fluorinated compound having at least one fluoropolyether segment and at least one isocyanate-reactive group, followed by reaction with a compound having one or more ethylenically unsaturated groups and at least one isocyanate-reactive group. The compound may also be made, for example, by reacting a polyisocyanate with a compound having one or more ethylenically unsaturated groups and at least one isocyanate-reactive group, followed by reaction with the fluorinated compound. In yet another embodiment, the compound can be made by reacting all components in a one pot reaction or single step reaction.

By their method of synthesis, the resulting compounds will normally be a mixture of compounds.

The cross-linkable compound may be prepared using solvents that are free of isocyanate-reactive groups. Suitable examples of such solvents include ethyl acetate, acetone, methyl isobutyl ketone, toluene and halogenated solvents, such as $C_4F_9OCH_3$, $C_4F_9OC_2H_5$, trifluorotoluene and hexafluoroxylene. The composition dissolved or dispersed in a solvent can be converted into an aqueous dispersion by adding water and subjecting the resulting mixture to vigorous stirring, preferably in the presence of an emulsifier. To obtain a stable dispersion the composition is then typically subjected to an ultrasonic treatment or a treatment in a high pressure homogenizer. The (organic) solvent can optionally be distilled off afterwards to obtain an essentially (organic) solvent-free dispersion.

The condensation reactions to form the compounds of the first compositions are conveniently carried out under conventional conditions well-known to those skilled in the art. Optimum reaction temperatures will be easily determined by those skilled in the art based on the particular reagents, solvents, and catalysts being used. Suitable temperatures are between about room temperature and about 120° C. The compounds of the first compositions are typically prepared in the presence of a catalyst. Suitable catalysts include tin salts such as dibutyltin dilaurate, stannous octanoate, stannous oleate, tin dibutyldi-(2-ethyl hexanoate), stannous chloride and others known in the art. The amount of catalyst present will depend on the particular reaction. Generally, suitable catalyst concentrations are from 0.001 to 10% by weight, particularly suitable between 0.1% and 5% by weight based on the total weight of reactants.

The compounds of the first compositions provided herein have two or more cross-linkable groups. That compound may be cross-linkable by irradiation and/or thermal treatment. To facilitate cross-linking, the first compositions may comprise at least one cationic or free-radical initiator. Free-radical initiators may generate free radicals for example upon thermal treatment or irradiation, for example with electron beams, IR-irradiation, UV-irradiation or combinations thereof.

Useful free-radical initiators or photoinitiators include, for example, those known as being useful in actinic radiation or e-beam radiation to cross-link compositions comprising ethylenically unsaturated monomers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE™ 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR™ 1173" from Ciba Specialty Chemicals Corporation) and 1-hydroxycyclohexyl phenyl ketone (commercially available under the trade designation "IRGACURE™ 184", also from Ciba Specialty Chemicals Corporation); 2-methyl-1-[4-(methylthio)phenyl]-2-(4-morpholinyl)-1-propanone commercially available under the trade designation "IRGACURE™ 907", also from Ciba Specialty Chemicals Corporation); 2-benzyl-2-(dimethylamino)-1-[4-(4-morpholinyl)phenyl]-1-butanone commercially available under the trade designation "IRGACURE™ 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI™ 784 DC", also from Ciba Specialty Chemicals Corporation); halomethylnitrobenzenes; and mono- and bis-acylphosphines such as those available from Ciba Specialty Chemicals Corporation under the trade designations "IRGACURE™ 1700", "IRGACURE™ 1800", "IRGACURE™ 1850", "IRGACURE™ 819" "IRGACURE™ 2005", "IRGACURE™ 2010", "IRGACURE™ 2020" and "DAROCUR™ 4265". Combinations of two or more photoinitiators may be used. Examples include a mixture of benzophenone with Irgacure™ 184, commercially available under the trade designation "IRGACURE™ 500".

Useful thermal initiators include azo compounds, such as azobisisobutyronitrile (ABIN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The amount of initiator used will depend on the particular reaction. Generally, suitable initiator concentrations are from 0.1% to 10% by weight, particularly suitable between 0.5% and 5% by weight based on the total weight of monomers. In a particular suitable embodiment, the cross-linking composition may be cross-linked in the presence of air.

In addition to the initiator, the coating composition can include a photosensitizer. The photosensitizer aids in the formation of free radicals that initiate cross-linking, especially in an air atmosphere. For example, photosensitizers such as 2-isopropyl thioxanthone, commercially available from First Chemical Corporation, Pascagoula, Miss., may be used in conjunction with a photoinitiator such as "IRGACURE™ 369". Further suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, 9,10-anthraquinone, and many other aromatic ketones. Suitable tertiary amines include, but are not limited to, methyldiethanolamine, ethyldiethanolamine, triethanolamine, phenylmethyl-ethanolamine and dimethyl aminoethyl benzoate. Typically, if used, an amount of photosensitizer is included in the cross-linking compositions to effect the desired level and rate of cross-linking Preferably, the amount of photosensitizer used in the cross-linkable compositions is about 0.01-10%, more preferably about 0.05-5%, and most preferably about 0.25-3% by weight, based on the total weight of the monomer solids. It should be understood that combinations of different photosensitizers can be used if desired.

The cross-linking reaction of the first composition is preferably carried out by UV-irradation, electon-beam irradiation and/or thermal treatment.

The cross-linking reaction may typically be carried out in the presence of a second composition comprising a fluorinated polyolefin. This is typically achieved by applying the first and second compositions to the surface to be coated and subjecting the mixture to conditions at which the first composition cures. The compositions may applied to the surface separately or sequentially or they may be provided as one composition, e.g. as a combination or mixture of first and second compositions.

Therefore, the coating compositions provided herewith may further contain a second composition or they may be used in combination with a second composition.

The second composition comprises or consists of one or more fluorinated polyolefins. The fluorinated polyolefins may have a partially fluorinated backbone, having generally at least 40% by weight fluorine, or a fully fluorinated backbone. Suitable fluorinated polyolefins comprise one or more units derived from fluorinated olefins, in particular fluorinated olefins having from 2 to 8 carbon atoms, such as tetrafluoroethylene (TFE), vinylidene fluoride (VDF), hexafluoropropene (HFP), chlorotrifluoroethylene (CTFE); fluorinated ethers, in particular perfluorinated alkyl vinyl ethers and perfluorinated alkyl allyl ethers, whose alkyl moieties have from 1 to 6 carbon atoms, for example perfluoro (n-propyl vinyl) ether (PPVE). The fluorinated polyolefins may comprise units derived from non-fluorinated olefins, such as ethylene or propylene.

Suitable fluorinated polyolefins include polytetrafluoroethylene (PTFE), copolymers of TFE and HFP (FEP polymers), copolymers of TFE and PPVE (PFA polymers), ethylenetetrafluoroethylene (ETFE) copolymers, terpolymers of TFE, HFP and VDF (THV) and polyvinylidene fluoride (PVDF). Of particular interest are copolymers of TFE, HFP and VDF.

The fluorinated polyolefins are typically used as an aqueous dispersion and typically have an average particle size number average of 100 to 300 nm.

Useful fluorinated polyolefin dispersions are commercially available and include for example: Dyneon™ TF 5032 PTFE and Dyneon™ THV 340Z, commercially available from Dyneon GmbH, and Teflon™ PTFE dispersions from DuPont de Nemours.

The coating compositions may also include optional additives. For example, if desired, the compositions may include nano- and/or microparticles. Suitable examples include oligomeric or polymeric silsesquioxanes. Useful silsesquioxanes can be any of the types described in U.S. Pat. No. 4,781,844 (Kortmann, et al), U.S. Pat. No. 4,351,736 (Steinberger et al.), U.S. Pat. No. 5,073,442 (Knowlton et al.) or U.S. Pat. No. 3,493,424 (Mohrlok et al.). These silsesquioxanes are derived from compounds of the formula $R^1$—Si (OR')$_3$ alone or together with silanes of the formula Si(OR')$_4$ wherein $R^1$ represents a substituted or unsubstituted hydrocarbon radical having 1 to 7 carbon atoms, substituents of which may be halogen atoms and amino, mercapto and epoxy groups, and up to 95% of the $R^1$ radicals may be methyl groups. R' represents an alkyl radical with 1 to 4 carbon atoms.

The coating compositions may further include other optional additives. For example, the compositions may include antistatic agents, wetting agents, waxes, levelling agents, UV-stabilizers and absorbers, ozon stabilizers, thermal stabilizers, antioxidants, fillers, lubricants, pigments, dyes, plasticizers, suspending agents, flow agents, viscosifiers and touch modifiers.

Useful wetting agents include ionic wetting agents, such as DOSS (sodium dioctyl sulfosuccinate), available from Cytec Industries, and neutral wetting agents, such as for example, isopropanol, butanol, butoxy ethanol and butoxy propanol.

Examples of levelling agents include, but are not limited to, alkylene oxide terminated polysiloxanes, such as those available under the trade designation "DOW 57" (a mixture of dimethyl-, methyl-, and (polyethylene oxide acetate-capped) siloxane) from Dow Corning, Midland, Mich.; and fluorochemical surfactants such as those available under the trade designations "FC4430" and "FC4432" from Minnesota Mining and Manufacturing Company Co., St. Paul, Minn. Combinations of different levelling agents can be used if desired. Preferably, if a levelling agent is to be included in the composition the levelling agent is present in an amount effective to improve the flow and wetting characteristics of the composition. Generally, the levelling agent will be effective to impart these desired characteristics in amounts of up to about 3% by weight and more preferably from about 0.5 to about 1% weight, based on the total weight of the cross-linked composition.

Both ultraviolet stabilizers and ultraviolet absorbers can improve the weatherability and reduce a time-induced discoloration of the cross-linked composition. An example of an ultraviolet absorber suitable for use in the cross-linked composition of the present invention is that commercially available under the trade designation "TINUVIN 1130" (hydroxyphenyl benzotriazole) and an example of an hindered amine light stabilizer is that commercially available under the trade designation "TINUVIN 292" (bis(1,2,2,6,6-pentamethyl-4-piperidinyl)sebacate) both of which are available from Ciba-Geigy. The cross-linkable composition can include a stabilizer, an absorber, or a combination thereof to impart the desired result. Preferably, the ultraviolet stabilizer and/or absorber is present in an amount up to about 10% by weight, and more preferably about 1-5% by weight, based on the total weight of the cross-linkable composition. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation "IRGANOX 1010" from Ciba-Geigy and phenothiazine commercially available from Aldrich Chemical Company, Inc., Milwaukee, Wis. The cross-linkable composition can include an effective amount of an ozone stabilizer to impart the desired result. Preferably, the ozone stabilizer is present in an amount up to about 1% by weight, more preferably from about 0.1 to about 1.0% by weight and most preferably from about 0.3 to about 0.5% by weight based on the total weight of the cross-linkable composition. It should be understood that combinations of different ozone stabilizers can be used if desired.

A thermal stabilizer/antioxidant reduces the amount of yellowing as a result of weathering. Examples of such materials include, but are not limited to, low melting hindered phenols and triesters. Specific examples include 2,6-di-tert-butyl-4-methylphenol, commercially available under the trade designation "ULTRANOX 226" from Borg Warner Chemicals, Inc., Parkersburg, N.Y.; octadecyl 3,5-di-tert-butyl-4-hydroxyhydroxcinnamate, commercially available under the trade designations "ISONOX 132" antioxidant from Schenectady Chemicals, Inc., Schenectady, N.Y.; or "VANOX 1320" commercially available from Vanderbilt Co., Inc., Norwalk, Conn. The cross-linkable composition can include an amount of the thermal stabilizer/antioxidant to impart the desired result. Preferably, the thermal stabilizer/antioxidant is present in an amount up to about 3% by weight, and more preferably about 0.5-1% by weight, based on the total weight of the cross-linkable composition. It should be understood that combinations of different thermal stabilizers/antioxidants can be used if desired.

The coating composition as described above, can be applied to the leather as 100% active composition, as solutions or as dispersions. Preferably they are applied as aqueous dispersions. Generally, the aqueous dispersion may comprise from about 3 to about 50% by weight of active compounds (based on the total weight of the dispersions). They may also comprise from about 0.5 to about 15% by weight (based on the total weight of the dispersions) of one or more dispersing agents.

Examples of dispersing agents include anionic, cationic, zwitterionic and non-ionic emulsifiers.

The aqueous dispersions typically include viscosifiers, which when added to the aqueous dispersion increase the viscosity without substantially modifying the other properties. The viscosifiers contribute to the formation of a homogeneous film on the coated leather substrate. Examples of useful viscosifiers include for example alkali-swellable thickeners, associative thickeners and inverse emulsion thickeners.

Of particular interest are inverse emulsion thickeners. Inverse emulsion thickeners include acrylic polymers and acrylamide polymers and the ammonium or sodium salts thereof. Inverse emulsion thickeners are commercially available and include for example Texipol™ 63-258, Texipol™ 63-201, Texipol™ 63-202, Texipol™ 63-253, Texipol™ 63-237 and Texipol™ 63-510, all commercially available from Scott Bader Co, Ltd, UK.

Generally, the aqueous dispersion may comprise from about 0.5 to about 10% by weight of one or more viscosifiers.

The amount of cross-linkable composition applied to the leather substrate is chosen such that desirable overall coating properties and good soil repellent and stain release characteristics are imparted to the leather substrate. Typically, the coating compositions are applied in anmounts such that the thickness of the cured layer obtained from curing the coating compositions is between about 0.1 and about 50 g/m$^2$, typically between about 0.5 and about 30 g/m$^2$, particularly between about 3 and about 20 g/m$^2$. Suitably, the weight percent of fluorine relative to the total weight of the coating composition is between about 0.1% and about 65% by weight, typically between about 0.5% and about 40% by weight, particularly between about 1 and about 20% by weight (based on the total weight of the coating composition).

The coating composition can be applied to the leather substrate (or to coated layers applied thereto) using a variety of techniques, including spray application or bar coat application. Coatings can be applied as a single layer or as two or more superimposed layers. After applying the coating composition and optional drying, the composition is caused to cross-link as described above.

The coating compositions provided herewith can be used to coat leather, in particular coated leather substrates and more particular coated leather substrates having a least one first layer as described above. In particular they may be used to provide soil repellency to the leather substrate. Suitable examples include leather substrates containing at least one continuous or discontinuous layer comprising a polymer or copolymer comprising one or more polyacrylates, polymethacrylate, polyurethanes, nitrocellulose, blends or copolymers thereof. Further examples of leather substrates include automotive leather, furniture upholstery leather, garment leather and shoe upper leather, preferably leather other than suede or nubuk. Typical examples of leather substrates include components of a piece of furniture, a seat, car interior, a stirring wheel, a shoe, a belt, a handbag, a garment and a glove.

Specific embodiments of the invention will now be summarized. The following list of embodiments is provided for illustrative purposes only and is not intended to limit the invention to the specific embodiments listed below.

1. A coated leather substrate having at least one surface that comprises at least one first layer above that surface and at least one second layer above that first layer and, the first layer comprises at least one polymer and wherein the second layer being different in its chemical composition from the first layer comprises the reaction product of a cross-linking reaction of at least one first composition said first composition comprising one or more compounds having at least one fluoropolyether segment and at least two cross-linkable groups and said second composition comprising at least one fluorinated polyolefin.
2. The leather substrate according to embodiment 1 wherein said first layer comprises a polymer or compolymer comprising polyacrylates, polymethacrylates, polyurethanes, nitrocelluloses, blends, combinations and copolymers thereof
3. The leather substrate according to any of the preceding embodiments wherein said fluoropolyether segment comprises repeating units selected from —C$_p$F$_{2p}$O—, —CFZO—, —CFZC$_p$F$_{2p}$O—, —C$_p$F$_{2p}$CFZO—, and mixtures thereof, wherein p is an integer of 1 to 4 and Z is F or a perfluoroalkyl group of 1 to 4 carbon atoms.
4. The leather substrate according to embodiment 3 wherein the fluoropolyether segment corresponds to the general formula: C$_3$F$_7$O(CF(CF$_3$)CF$_2$O)$_n$CF(CF$_3$)— wherein n has a value of 1 to 60.
5. The leather substrate according to any of the preceding embodiments wherein said cross-linkable groups are cross-linkable by electron beams, cross-linkable by thermal treatment, cross-linkable by UV irradiation or a combination thereof
6. The leather substrate according to any of the preceding embodiments wherein said cross-linkable groups are ethylenically unsaturated groups cross-linkable by UV-irradiation.
7. The leather substrate according to any of the preceding embodiments wherein said cross-linkable groups cross-linkable by UV irradiation and are selected from acrylates and/or methacrylates.
8. The leather substrate according to any of the preceding embodiments wherein the at least one compound having two or more cross-linkable groups and at least one fluoropolyether segment of the first composition is the reaction product of
   a. a polyisocyanate,
   b. a fluorinated compound having at least one fluoropolyether segment and having at least one isocyanate-reactive group and
   c. an organic compound having one or more ethylenically unsaturated groups and having at least one isocyanate-reactive group.

9. The leather substrate according to embodiment 8 wherein said organic compound has two or more ethylenically unsaturated groups, selected from acrylate and/or methacrylate groups.

10. The leather substrate according to embodiments 8 and 9, wherein said polyisocyanate is a biuret-containing isocyanate having three or more isocyanate groups.

11. The leather substrate according to any of the preceding embodiments, wherein the fluorinated polyolefin comprises one or more units derived from tetrafluoroethylene (TFE), hexafluoropropylene (HFP), vinylidene fluoride (VDF), chlorotrifluoroethylene (CTFE), perfluoroalkylvinyl ether, perfluoroalkylallyl ether and combinations thereof 12. The leather substrate according to embodiment 11, wherein the fluorinated polyolefin comprises a copolymer of TFE, HFP and VDF.

13. The leather substrate according to any of the preceding embodiments wherein the weight ratio of the first composition to the second composition is between 95/5 and 10/90.

14. The leather substrate according to any of the preceding embodiments wherein the amount of second layer is between 0.1 and 50 g/m².

15. The leather substrate according to any one of the preceding embodiments wherein the leather substrate is selected from a piece of furniture, a piece of an interior equipment of a car, a garment, a part of a shoe, a seat or a part of a seat, a stirring wheel or a part of a stirring wheel, a belt or a part of a belt, a handbag or a part of a handbags, a glove or a part of a glove.

16. The leather substrate according to any one of the preceding embodiments wherein the cross-linking reaction of the first composition is carried out in the presence of the second composition.

17. Cross-linkable coating composition comprising:
   a. at least one compound having two or more cross-linkable groups that are cross-linkable by UV-irradiation, thermal treatment or electron irradiation, and at least one fluoropolyether segment and
   b. at least one fluorinated polyolefin.

18. The coating composition according to embodiment 17 wherein said fluoropolyether segment comprises repeating units selected from $-C_pF_{2p}O-$, $-CFZO-$, $-CFZC_pF_{2p}O-$, $-C_pF_{2p}CFZO-$, and mixtures thereof, wherein p is an integer of 1 to 4 and Z is F or a perfluoroalkyl group of 1 to 4 carbon atoms.

19. The coating composition according to embodiment 18 wherein the fluoropolyether segment corresponds to the general formula: $C_3F_7O(CF(CF_3)CF_2O)_nCF(CF_3)-$ wherein n has a value of 1 to 60.

20. The coating composition according to embodiments 17 to 19, wherein said cross-linkable groups are ethylenically unsaturated groups 21. The coating composition according to embodiments 17 to 20 wherein the cross-linkable groups are selected from acrylate and/or methacrylate groups.

22. The coating composition according to embodiments 17 to 21, wherein said compound is the reaction product of
   a. a polyisocyanate,
   b. a fluorinated compound having at least one fluoropolyether segment and having at least one isocyanate-reactive group and
   c. a compound having one or more ethylenically unsaturated groups and at least one isocyanate-reactive group.

23. The coating composition according to embodiment 22, wherein the compound according to c. has two or more ethylenically unsaturated groups selected from acrylate and/or methacrylate groups.

24. The coating composition according to embodiments 22 and 23, wherein said polyisocyanate is a biuret-containing isocyanate having three or more isocyanate groups.

25. The coating composition according to any of the embodiments 17 to 24 wherein the fluorinated polyolefin comprises units derived from tetrafluoroethylene (TFE), hexafluoropropylene (HFP), vinylidene fluoride (VDF), chlorotrifluoroethylene (CTFE), perfluoroalkylvinyl ether, perfluoroalkyl allyl ether and combinations thereof 26. The coating composition according to embodiment 25, wherein the fluorinated polyolefin comprises a copolymer of TFE, HFP and VDF.

27. The coating composition according to any of the embodiments 17 to 26 wherein the weight ratio of said compound comprising two or more ethylenically unsaturated groups and a fluoropolyether segment to said fluorinated polyolefin is between 95/5 and 10/90.

28. The coating composition according to any of the embodiments 17 to 27 further comprising a free radical initiator that can be activated upon exposure to actinic radiation or e-beam radiation.

29. The coating composition according to any one of embodiments 17 to 28, wherein the composition is a two part composition comprising the compounds according to a. and b. separated from each other.

30. Method of making a leather substrate as claimed in any one of the preceding embodiments comprising applying a coating composition according to any one of embodiments 17 to 29 to a leather substrate.and causing the coating composition to cross-link.

31. Method according to embodiment 30 wherein the cross-linking is carried out by thermal treatment, UV-irradiation, actinic radiation and/or e-beam radiation.

32. The method according to embodiment 31 wherein the coating composition further comprises a free radical initiator.

33. The method according to embodiments 30 to 32 wherein coating composition is applied to a coated leather substrate containing at least continuous or discontinuous layer comprising a polymer or copolymer comprising one or more polyacrylates, polymethacrylate, polyurethanes, nitrocellulose, blends or copolymers thereof.

34. The method according to embodiments 30 to 33 wherein the leather substrate is selected from automotive leather, furniture upholstery leather, garment leather and shoe upper leather.

35. The method according to any one embodiments 30 to 34 wherein the leather substrate is a component of a piece of furniture, a seat, car interior, a stirring wheel, a shoe, a belt, a handbag, a garment and a glove.

36. Use of a composition according to embodiments 17 to 29 for coating leather.

37. The use of embodiment 36 wherein the leather is a coated leather substrate containing at least continuous or discontinuous layer comprising a polymer or copolymer comprising one or more polyacrylates, polymethacrylate, polyurethanes, nitrocellulose, blends or copolymers thereof 38. The use according to embodiments 36 to 37 wherein the leather substrate is selected from automotive leather, furniture upholstery leather, garment leather and shoe upper leather.

39. The use according to any one embodiments 36 to 39 wherein the leather substrate is a component of a piece of furniture, a seat, car interior, a stirring wheel, a shoe, a belt, a handbag, a garment and a glove.

EXAMPLES

The following examples further illustrate the invention without the intention to limit the invention thereto. All parts are by weight unless indicated otherwise.

ABBREVIATIONS

| Abbreviations | Product | Supplier |
|---|---|---|
| Desmodur ™ N | Biuret-containing triisocyanate of HMDI | Bayer |
| SR444 | Pentaerythritol triacrylate | Sartomer, Cray Valley |
| SERMUL ™ EA 266 | C13 alcohol polyethylene glycol ether (15EO) suphate, Na salt | Elementis Specialties Netherlands B.V., the Netherlands |
| Texipol ™ 63-258 | Inverse emulsion thickener | Scott Bader Company Ltd, UK |
| Irgacure ™ 500 | Mixture of 1-Hydroxy-cyclohexyl-phenyl-ketone and benzophenone | Ciba Specialty Chemicals |
| FPO-1 | Fluorinated polyolefin 1. Aqueous dispersion (29.1%) of a terpolymer of hexafluoropropylene (HFP), vinylidene fluoride (VDF) and tetrafluorethylene | Dyneon GmbH, Gendorf, Germany |
| FPO-2 | Fluorinated polyolefin 2. Dyneon ™ TF 5032 PTFE: aqueous poly tetrafluoroethylene (TFE) dispersion (59% solids) | Dyneon GmbH, Gendorf, Germany |
| FPO-3 | Fluorinated polyolefin 3. Aqueous dispersion (50% solids) of a copolymer of TFE and perfluoropropyl vinyl ether | Dyneon GmbH, Gendorf, Germany |
| FPO-4 | Fluorinated polyolefin 4. Dyneon ™ THV 340Z: aqueous dispersion (50% solids) of a copolymer of TFE, HFP and VDF | Dyneon GmbH, Gendorf, Germany |

Synthesis of Fluorinated Compound $F(CF(CF_3)CF_2O)_{6.85}CF(CF_3)C(O)NHCH_2CH_2OH$/Desmodur™ N/SR444 (mole ratio 0.15/1/0.85):

a. Synthesis of HFPO-alc: $F(CF(CF_3)CF_2O)_{6.85}CF(CF_3)C(O)NHCH_2CH_2OH$

HFPO-alc was prepared according to WO2007121110, page 17, lines 17-32 b. Synthesis of 50% solids solution of fluorinated compound in ethylacetate:

A 50% solids solution of the fluorinated compound was prepared according to the procedure for reaction product No 4 (RP-4) in US 20070243389.

c. Aqueous dispersion of fluorinated compound

An aqueous dispersion of the fluorinated compound was prepared as follows: 1000 g of the 50% solution of the fluorinated compound in ethylacetate was heated to 60° C. and added to a 60° C. aqueous solution of 92.6 g Sermul™ EA266 in 642 g water while stirring. The mixture was passed twice through a 2-stage Manton-Gaulin homogenizer set at 250/50 bar. Ethylacetate was distilled off with a rotary evaporator using water jet vacuum to obtain a 48.9% aqueous dispersion of the fluorinated compound.

Method of Application

Spray Application

The substrates were treated with an aqueous coating composition using spray application. An amount of 1.25 g product mix was sprayed crossways on a 0.5 square ft (0.0465 m$^2$) of substrate using an air-atomized spray gun at 3 bar pressure and 1.5 mm tip, followed by drying 2 minutes at 80° C. in a Werner Mathis oven. This spray and dry procedure was carried out twice. The samples were subsequently cured with an ultraviolet (UV) curing device (available from American UV Co., Murray Hill, N.Y., USA) equipped with a mercury medium pressure H bulb AUV6A/300 OF. The samples were passed twice through the UV instrument at 200 W/inch to obtain full curing of the coating.

Substrates

The compositions were tested on following substrates:

| Substrate | Kind | Available from |
|---|---|---|
| Substrate 1 | SKAI synthetic leather | Modecoupon, Lokeren, Belgium |

-continued

| Substrate | Kind | Available from |
|---|---|---|
| Substrate 2 | beige base-coated smooth grain automotive leather type Alpacagrau NAPPA KOMBI | Seton Lederfabrik GmbH |
| Substrate 3 | beige base-coated embossed grain automotive leather type Alpacagrau NAPPA KOMBI | Seton Lederfabrik GmbH |

Testing Procedures

The treated substrates were subjected to following testing procedures:

A. Soiling test method A: test with EMPA fabric No. 104 (indicated as "Soil A") Test specimens with a diameter of 140 mm are cut out of the coated substrate, using a circular cutting device. The test samples were evaluated on a Martindale Abrasion and Pilling tester in pilling mode, using EMPA 104 fabrics obtained from EMPA Test materials (Switzerland). EMPA 104 is a plain woven polyester/cotton 65/35 fabric soiled with a mixture of IEC carbon black and olive oil. The fabric is fitted to the pilling holder head and the test specimen is mounted on the abrading table with a wool felt underlay. The tests were run with a 12 kPa weight for 250 cycles using a Lissajous pattern (C-C-C position).

The degree of soiling (ΔE soiled) was measured using a Minolta colorimeter, taking the base-coated (unsoiled) substrate as the reference. The results are recorded as "ΔE Soil A—initial".

Subsequently 50% of the circular soiled surface was cleaned with a leather cleaner (obtained from Uniters S.p.A., Italy) using a sponge. The degree of soiling was then measured again with a Minolta colorimeter. The results are recorded as "ΔE Soil A—cleaned"

B. Soiling test method B: test with EMPA fabric No. 170 (indicated as "Soil B")

Test specimens with a diameter of 140 mm are cut out of the coated substrate using a circular cutting device. The test samples were evaluated on a Martindale Abrasion and Pilling tester in pilling mode, using EMPA Jeans Fabric No. 170 obtained from EMPA Testmaterials (Switzerland).

EMPA Jeans 170-7-1172 is cotton jeans indigo/sulfur black dyed, soiled with a mixture of sebum, carbon black and sweat.

The EMPA Jeans 170 was fitted to the pilling holder head and the test specimen was mounted on the abrading table with a wool felt underlay. The tests were run with a 12 kPa weight for 1000 cycles using a Lissajous pattern (C-C-C position).

The degree of soiling (ΔE soiled) was measured using a Minolta colorimeter, taking the base-coated unsoiled substrate as the reference. The results are recorded as "ΔE Soil B—initial"

Subsequently 50% of the circular soiled surface was cleaned with a leather cleaner (obtained from Uniters S.p.A., Italy) using a sponge. The degree of soiling was then measured again with a Minolta colorimeter (ΔE cleaned). The results are recorded as "ΔE Soil B—cleaned"

C. Household stain tests (indicated as "Soil C")

An amount of the household liquid (hot coffee, red wine: 5 ml; ketchup: 2 ml) was applied on the test specimen with a pipette and spread around within a circular aluminium ring of 7 cm diameter. The stained substrate was conditioned for 24 hours. Excess liquid was first removed with a cloth, then the surface was cleaned with a wet sponge (=cleaning with water), followed by cleaning with a leather cleaner (obtained from Uniters S.p.A., Italy) using a sponge (=cleaning with water and leather cleaner).

The degree of staining was then measured using a Minolta colorimeter, taking unstained substrate as the reference. The degree of soiling is indicates as ΔE coffee, ΔE red wine and ΔE ketchup.

D. 60° Gloss

The gloss of a treated sample was measured using a Super3Gloss meter, available from Elcometer Instruments at 60° angle setting.

E. Flex testing

A Bally Penetrometer, model 5023 was used to test the flexibility of the coated samples. A test sample was mounted between the clamps of the instrument and subjected to 50,000 flexes (test method E), whereby the test sample was alternately buckled and stretched by the machine. The integrity of the coating was observed after 'flexing' via FE-SEM (Field Emission Scanning Electron Microscopy.

EXAMPLES

Examples 1 to 4

In examples 1 to 4, coating formulations were prepared by blending 65% by weight of the fluorinated compound dispersion with 35% by weight of fluorinated polyolefin dispersions FPO-1 to FPO-4, as indicated in table 1. 1% Irgacure 500 and 1% Texipol 63-258 were added. Deionized water was added to obtain a 7.5% solids coating composition. The components were mixed until a homogeneous liquid was obtained. The formulations were applied to Substrate 1 according to the method of application described above. 60° Gloss and anti-soiling characteristics, according to the test methods "Soil A" and "Soil B" and Household stain test, were evaluated. The results are given in table 1.

TABLE 1

60° gloss and anti-soiling properties of treated Substrate 1 (ΔE)

| | | | Soil Resistance (ΔE) | | | | Stain Resistance (ΔE) | | |
| | | | Soil A | | Soil B | | Stains cleaned with water | | |
| | Fluoropolymer | 60° | | | | | | | |
| Ex | dispersion | gloss | Initial | Clean | Initial | Clean | Coffee | Ketchup | Red wine |
|---|---|---|---|---|---|---|---|---|---|
| 1 | FPO-1 | 6.3 | 1.0 | 0.3 | 3.0 | 1.0 | 1.7 | 0.5 | 2.0 |
| 2 | FPO-2 | 6.3 | 1.4 | 0.8 | 3.9 | 2.0 | 1.4 | 0.3 | 1.8 |
| 3 | FPO-3 | 6.4 | 1.3 | 0.9 | 3.3 | 1.7 | 1.2 | 0.5 | 1.7 |
| 4 | FPO-4 | 5.5 | 1.0 | 0.6 | 2.3 | 1.1 | 1.1 | 0.4 | 1.1 |

Examples 5 to 8

In examples 5 to 8, coating formulations were prepared by blending 65% by weight of the fluorinated compound dispersion with 35% by weight of fluoropolymer dispersions FPO-1 or FPO-4 as indicated in tables 2 and 3. 1% Irgacure 500 and 1% Texipol 63-258 were added. Deionized water was added to obtain a 7.5% solids coating composition. The components were mixed until a homogeneous liquid was obtained. The formulations were applied to Substrates 2 and 3 according to the method of application described above. 60° Gloss and anti-soiling characteristics, according to the test methods "Soil A" and "Soil B" and Household stain test, were evaluated. The results are given in tables 2 and 3. Substrate 2, treated with a blend of fluorinated compound with FPO-4 (example 6) was evaluated for flexibility in the Bally Penetrometer tester. After 50,000 flexes, the surface was evaluated via FE-SEM (Field Emission Scanning Electron Microscopy. SEM pictures taken of the tested substrate at a magnification of X100 or X1000 do not retrieve any crack formulation.

TABLE 2

60° gloss and anti-soiling properties of treated Substrate 2 (ΔE)

| | | | Soil Resistance (ΔE) | | | Stain Resistance (ΔE) | | |
| | Fluoropolymer | 60° | Soil A | | Soil B | | Stains cleaned with water | | |
| Ex | dispersion | gloss | Initial | Clean | Initial | Clean | Coffee | Ketchup | Red wine |
|---|---|---|---|---|---|---|---|---|---|
| 5 | FPO-1 | 4.4 | 0.4 | 0.2 | 0.8 | 0.6 | 0.3 | 0.3 | 0.3 |
| 6 | FPO-4 | 3.7 | 0.4 | 0.3 | 1.3 | 0.6 | 0.9 | 0.4 | 0.5 |

TABLE 3

60° gloss and anti-soiling properties of treated Substrate 3 (ΔE)

| | | | Soil Resistance (ΔE) | | | Stain Resistance (ΔE) | | |
| | Fluoropolymer | 60° | Soil A | | Soil B | | Stains cleaned with water | | |
| Ex | dispersion | gloss | Initial | Clean | Initial | Clean | Coffee | Ketchup | Red wine |
|---|---|---|---|---|---|---|---|---|---|
| 7 | FPO-1 | 2.4 | 1.2 | 0.9 | 2.0 | 1.2 | 0.8 | 0.5 | 1.1 |
| 8 | FPO-4 | 2.3 | 0.8 | 0.4 | 1.5 | 0.8 | 1.1 | 0.4 | 0.7 |

The invention claimed is:

1. A coated leather substrate having at least one surface that comprises at least one first layer above that surface and at least one second layer above that first layer and, the first layer comprises at least one polymer and wherein the second layer being different in its chemical composition from the first layer comprises the reaction product of a cross-linking reaction of at least one first composition said first composition comprising one or more compounds having at least one fluoropolyether segment and at least two cross-linkable groups and said second composition comprising at least one fluorinated polyolefin;

wherein the one or more compounds having two or more cross-linkable groups and at least one fluoropolyether segment of the first composition are a reaction product of components comprising:
  a. a polyisocyanate;
  b. a fluorinated compound having at least one fluoropolyether segment and having at least one isocyanate-reactive group; and
  c. a compound having one or more ethylenically unsaturated groups and having at least one isocyanate-reactive group.

2. The leather substrate according to claim 1 wherein said fluoropolyether segment comprises repeating units selected from $-C_pF_{2p}O-$, $-CFZO-$, $-CFZC_pF_{2p}O-$, $-C_pF_{2p}CFZO-$, and mixtures thereof, wherein p is an integer of 1 to 4 and Z is F or a perfluoroalkyl group of 1 to 4 carbon atoms.

3. The leather substrate according to claim 1 wherein said cross-linkable groups are cross-linkable by electron beam irradiation, cross-linkable by thermal treatment, cross-linkable by UV irradiation or a combination thereof.

4. The leather substrate according to claim 1 wherein said cross-linkable groups are ethylenically unsaturated groups.

5. The leather substrate according to claim 1 wherein said cross-linkable groups are selected from acrylates and/or methacrylates.

6. The leather substrate according to claim 1, wherein the fluorinated polyolefin comprises one or more units derived from tetrafluoroethylene (TFE), hexafluoropropylene (HFP), vinylidene fluoride (VDF), chlorotrifluoroethylene (CTFE), perfluoroalkylvinyl ether, perfluoroalkylallyl ether and combinations thereof.

7. The leather substrate according to claim 1 wherein the cross-linking reaction of the first composition is carried out in the presence of the second composition.

8. The leather substrate according to claim 1 wherein the leather substrate is selected from a piece of furniture, a piece of an interior equipment of a car, a component of a garment, a component of a shoe, a component of a seat, a component of a stirring wheel, a component of a belt, a component of a handbag or a component of a glove.

* * * * *

UNITED STATES PATENT AND TRADEMARK OFFICE
CERTIFICATE OF CORRECTION

| | | |
|---|---|---|
| PATENT NO. | : 9,062,150 B2 | |
| APPLICATION NO. | : 13/503822 | |
| DATED | : June 23, 2015 | |
| INVENTOR(S) | : Frans A. Audenaert | |

It is certified that error appears in the above-identified patent and that said Letters Patent is hereby corrected as shown below:

In the Specification

Column 3

Line 45, delete "ethlyenically" and insert -- ethylenically --, therefor.

Column 4

Line 39, delete "Zerewittenoff" and insert -- Zerewitinoff --, therefor.

Column 8

Line 66, delete "cross-linking" and insert -- cross-linking. --, therefor.

Column 9

Line 7, delete "UV-irradation, electon" and insert -- UV-irradiation, electron --, therefor.

Column 10

Line 4, delete "ozon" and insert -- ozone --, therefor.

Column 11

Line 1, delete "hydroxyhydroxcinnamate," and insert -- hydroxyhydrocinnamate, --, therefor.

Column 11

Line 45, delete "anmounts" and insert -- amounts --, therefor.

Column 12

Line 7, delete "nubuk." and insert -- nubuck. --, therefor.

Signed and Sealed this
Eighth Day of March, 2016

Michelle K. Lee
*Director of the United States Patent and Trademark Office*

Column 12

Lines 28-29, delete "compolymer" and insert -- copolymer --, therefor.

Column 12

Line 31, delete "thereof" and insert -- thereof. --, therefor.

Column 12

Line 47, delete "thereof" and insert -- thereof. --, therefor.

Column 3

Line 15 (approx.), delete "thereof" and insert -- thereof. --, therefor.

Column 13

Line 55, delete "groups" and insert -- groups. --, therefor.

Column 14

Line 13, delete "thereof" and insert -- thereof. --, therefor.

Column 14

Line 33, delete "substrate.and" and insert -- substrate and --, therefor.

Column 14

Line 63, delete "thereof" and insert -- thereof. --, therefor.

Column 15

Line 2, delete "subtrate" and insert -- substrate --, therefor.

Column 15

Line 16 (approx.), delete "suphate," and insert -- sulphate, --, therefor.

Column 15

Line 24 (approx.), delete "tetrafluorethylene" and insert -- tetrafluoroethylene --, therefor.

Column 15

Line 42, delete "17-32" and insert -- 17-32. --, therefor.

Column 16

Line 41, delete "17-32" and insert -- 17-32. --, therefor.

CERTIFICATE OF CORRECTION (continued)
U.S. Pat. No. 9,062,150 B2

Column 16

Line 44, delete "Alpacagrau" and insert -- Alpaca grau --, therefor.

Column 17

Line 3, delete "cleaned"" and insert -- cleaned". --, therefor.

Column 17

Line 21, delete "initial"" and insert -- initial". --, therefor.

Column 17

Line 47, delete "cleaned"" and insert -- cleaned". --, therefor.